Sept. 8, 1942.    D. W. EXNER    2,295,393
REGULATING SYSTEM
Filed Feb. 28, 1941
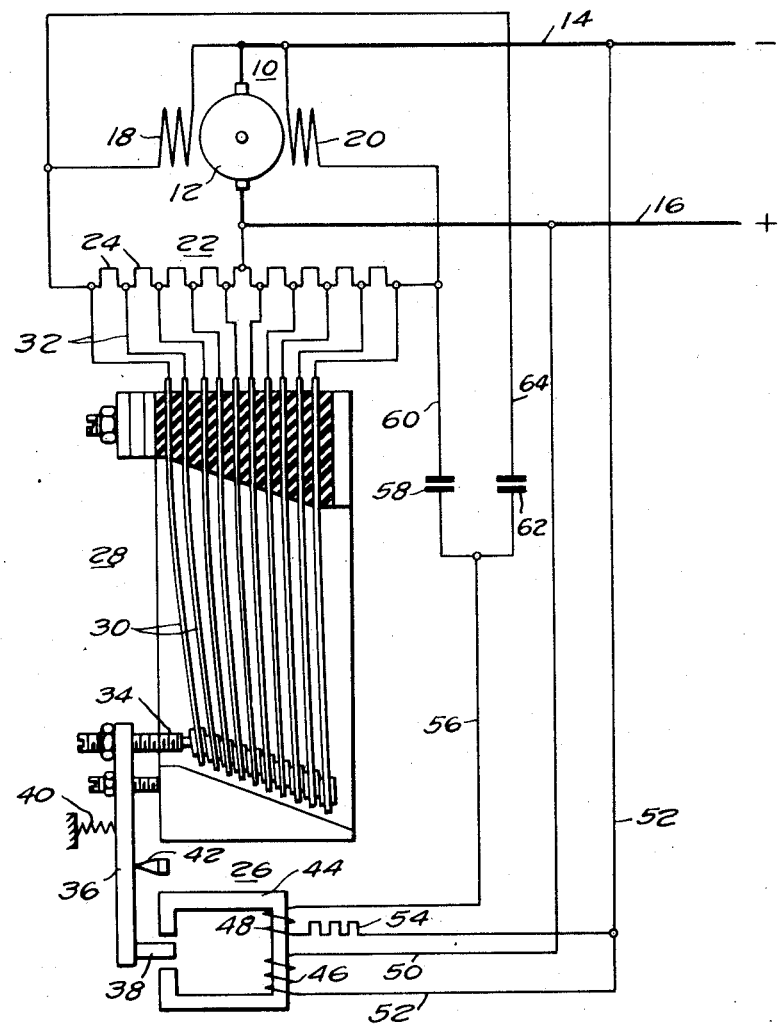
WITNESSES:
INVENTOR
Donald W. Exner.
BY
ATTORNEY Patented Sept. 8, 1942

2,295,393

UNITED STATES PATENT OFFICE 2,295,393

REGULATING SYSTEM

Donald W. Exner, Forest Hills, Pa., assignor to Westinghouse Electric & Manufacturing Company, East Pittsburgh, Pa., a corporation of Pennsylvania Application February 28, 1941, Serial No. 381,101

5 Claims. (Cl. 171—223)

This invention relates to voltage regulating systems.

In voltage regulators it is desired to employ apparatus, and particularly magnetic operating elements, which are light in weight, low in cost, and highly sensitive. Such regulating apparatus are particularly desirable for use with aircraft generators where weight and space are a primary consideration. Different apparatus have been developed for such use, one of the most desirable being the regulating apparatus known to the trade as the "Silverstat," and which is disclosed and claimed in the application of C. R. Hanna, Serial No. 203,876, filed April 23, 1938, and assigned to the same assignee as this invention. However, even with such regulating apparatus, it is found that when used with aircraft generators or the like severe voltage hunting may be encountered. This hunting is apparently encountered because the mechanical and magnetic time constant of the regulator is too nearly the same as the time constant of the generator. It is not, however, feasible to employ damping transformers to overcome this hunting condition, since such damping transformers are so large and heavy as to be prohibitive in these applications.

It is therefore an object of this invention to provide a regulating system for a generator in which the operation of a voltage controlling resistor is so controlled in accordance with a function of the generator voltage that hunting is not encountered.

A further object of this invention is to provide a regulating system for a generator including a plurality of windings for controlling the operation of a voltage controlling resistor, the windings comprising a main control winding and a second winding in which a current flows in response to a change in the voltage across the generator field windings to change the magnetic field induced by the main winding, and thereby control the operation of the resistor operating means.

Other objects and advantages of this invention will be apparent from the following description when taken in conjunction with the accompanying drawing in which the single figure is a diagrammatic view of the improved apparatus and system embodying the features of this invention.

Referring to the drawing, the invention is illustrated by reference to a regulating system for regulating the voltage of a generator 10. The generator 10 illustrated is a direct current generator suitable for use in aircraft equipment, and is driven by any suitable prime mover (not shown). The generator 10 comprises an armature 12 electrically connected by conductors 14 and 16 to any given load which is to be supplied. In the particular embodiment illustrated, the generator 10 is provided with a plurality of shunt field windings 18 and 20 connected in parallel across the armature winding 12.

A variable resistor 22 having a plurality of resistor sections 24 is provided for controlling the energization of the field windings 18 and 20. The resistor 22 is so disposed that a different portion of it is electrically connected in series circuit relation with each of the field windings 18 and 20.

The variable resistor 22 comprises one of the elements of a rheostatic controller which controls the energization of the field windings 18 and 20 in response to the output voltage of the generator 10. Other elements of the rheostatic controller comprise a magnetic structure 26 and a spring leaf assembly 28 so associated with the resistor 22 and conductors 14 and 16 as to control the electrical connections of the resistor sections 24.

The spring leaf assembly 28 comprises a plurality of spring leaves 30 arranged in a stack having their fixed ends insulated from each other and connected by conductors 32 to a plurality of taps between the resistor sections 24 of resistor 22. The other ends of the spring leaves 30 are disposed to be normally separated, but carry contact members and can be forced to progressively contact each other when actuated by a driving member 34. Specific details of the leaf spring assembly 28 are described in the Hanna application Serial No. 203,876 referred to hereinbefore.

The driving member 34 is usually carried at one end of a movable arm 36, the other end being provided with an armature 38 which, in turn, is positioned within the air gap of the core member 44 of magnetic structure 26. A spring member 40 is provided for normally biasing the movable arm 36 about its pivot point 42 to force the driving member 34 against the spring leaves 30. The core member 44 of the magnetic structure is provided with a plurality of windings 46 and 48 for inducing a magnetic field therein, both of the windings having the same winding direction on the core member. The winding 46 is the main control winding and is so connected by conductors 50 and 52 as to be energized in accordance with the voltage across conductors 14 and 16.

The winding 48, sometimes called a "tickler coil," is provided for cooperating with the winding 46 to prevent hunting of the control apparatus. As illustrated, one end of the winding 48 is connected through a resistor 54, conductor 52 and conductor 14 to one end of the field windings 18 and 20. The other end of the winding 48 is connected by conductor 56 through a capacitor 58 and conductor 60 to the other end of the field winding 20 and by conductor 56 through capacitor 62 and conductor 64 to the other end of field winding 18. The capacitors 58 and 62 are thus connected in series circuit with the winding 48 but in parallel circuit relation with each other. Thus one of the capacitors 58 or 62, the winding 48 and resistor 54 are connected across each of the field windings and responsive to a change in the voltage across the field winding, the connections of the winding 48 giving the winding 48 the same magnetic polarity as the winding 46 when the voltage across one or both fields is increasing.

Although illustrated for an extreme condition for the system, the magnetic structure 26 and spring leaf assembly 28 are usually so adjusted that for a given voltage across conductors 14 and 16 the magnetic pull on the armature 38 balances the force of the spring 40 to maintain the driving member 34 in such a position as to permit a portion of the conducting spring leaves 30 to be spaced apart, thereby electrically connecting a portion of, or a number of, the resistor sections 24 in circuit with the field windings 20 and 18.

In operation, assuming that the prime mover (not shown) is operating the generator 10 at a given speed for impressing a given voltage across conductors 14 and 16, the main control winding 46 is so energized in accordance with this voltage as to normally effect the separation of the spring leaves 30 beginning at the right-hand side of the stack and progressing towards the left, while, at the same time, by reason of the separation of the contact members carried by the spring leaves 30 progressively introducing resistor sections 24 beginning at the right-hand terminal of resistor 22 and progressing towards the other terminal of the resistor. With the generator 10 impressing a given voltage across conductors 14 and 16 and the energization of the field windings 18 and 20 being constant for the given generator voltage, the winding 48 has no effect on the magnetic field induced by the main control winding 46.

If, for any reason, the voltage across conductors 14 and 16 is decreased, the winding 46 is accordingly deenergized and the driving member 34 actuates the spring leaves 30 to progressively short-circuit or shunt more of the resistor sections 24 from series circuit with the field winding 18. If such shunting of the resistor sections 24 associated with the field winding 18 is insufficient to effect the energization of the winding 18 to produce the desired increase in the generator voltage, additional sections 24 of resistor 22 which are associated with the field winding 20 are shunted or short-circuited to increase the energization of winding 20 and consequently increase the generator voltage. With only the main control winding 46 present on the magnetic structure 26, the driving member 34 is actuated to short-circuit more of the resistor sections 24 than are necessary, due to the momentum of the armature, thereby energizing the field windings 18 and 20 more than is necessary to produce the given voltage across conductors 14 and 16.

However, with winding 48 cooperating with the winding 46, the voltage hunting of generator 10 is prevented. This is apparent when it is noted that the winding 48 and the capacitors 58 and 62 in series circuit therewith, but which are of themselves connected in parallel, are connected across the shunt field windings 20 and 18, respectively, and the energization of the winding 48 is therefore responsive to a rate of change in the voltage across the field windings 20 and 18.

As the field winding is energized by short-circuiting resistor sections 24 from series circuit therewith in response to the actuation of the driving member 34, the voltage across field winding 18 is increased effecting a flow of current through conductor 64, charging capacitor 62, conductor 56, winding 48, resistor 54 and conductor 52 to the other end of field winding 18, the flow of current through the winding 48 establishing a magnetic field which cooperates with the magnetic field of winding 46 to increase the magnetic pull on the armature 38.

If, as stated hereinbefore, the short-circuiting of resistor sections 24 associated with the field winding 18 is insufficient to produce the desired energization of the field windings to cause the generator to impress the desired voltage across the conductors 14 and 16, additional resistor sections 24 associated with the field winding 20 are short-circuited to increase the energization of the field winding 20 and current flows through conductor 60, capacitor 58 to charge it, conductor 56, field winding 48, resistor 54 and conductor 52 back to the other end of field winding 20, the current flowing in the winding 48 inducing a magnetic field which cooperates with the magnetic field of winding 46 to control the operation of the rheostatic controller. Of course, when the voltage across conductors 14 and 16 reaches the desired value, further change in the energization of field windings 18 and 20 is not obtained, and consequently current does not flow in the winding 48 since the potential across the field windings 18 and 20 remains constant.

If, for any reason, the voltage across conductors 14 and 16 increases, the energization of the winding 46 is accordingly increased to actuate the driving member 34 in a direction to progressively insert resistor sections 24 in series circuit with the field wndings 20 and 18, respectively, depending upon the setting of the spring leaf assembly 28 at the time the impressed voltage is changed. As the resistor sections 24 are inserted in series with the field winding 20 the voltage across field winding 20 decreases and current flows through conductor 52, resistor 54, winding 48, capacitor 58, capacitor 58 and conductor 60 to the other end of field winding 20, the flow of current through the winding 48 establishing a magnetic field which is in opposition to the magnetic field induced by winding 46 to prevent the addition of more resistor sections 24 than are necessary to effect the desired energization of the field winding 20 and consequently the voltage across conductors 14 and 16. However, if the deenergization of the field winding 20 by the insertion of the resistor sections 24 in series therewith is insufficient to reduce the voltage across the conductors 14 and 16 to a desired value, additional resistor sections 24 are inserted in series circuit with the field winding 18 to effect a decrease in the energization of the field winding 18. With this change in the potential across field winding 18, it is found that current flows from one end of the field winding 18 through conductor 14, conductor 52, resistor 54, winding 48, conductor 56, capacitor 62 and conductor 64 to the other end of the field winding 18, the flow of current in the winding 48 inducing a magnetic field which is in opposition to the magnetic field induced by the main control winding 46 to give a composite magnetic pull on the armature 38 which will, in effect, decrease the movement of the driving element 34 and thereby prevent the insertion of as many of the resistor sections 24 in series with the field winding 18 as would be inserted if the winding 48 were not provided on the magnetic structure 26.

It is thus seen that the addition of the capacitor circuits across the shunt field windings of the generator 10 prevents overshooting in the adjustment of the energization of the field windings 18 and 20. However, in providing the capacitor circuits, it is necessary to have a definite range of time constant for the capacitors 58 and 62 and the winding 48 to give the optimum anti-hunting effect. With the spring leaf assembly 28 illustrated or any other regulator having a finite number of resistance steps there is an instantaneous change in the field voltage as each contact makes and breaks. If the resistance of the capacitor circuit is too low giving a short time constant, the capacitors 58 and 62 will charge or discharge rapidly and the sudden change in magnetic pull on the armature 38 will exert a ballistic force on the armature instead of a more uniform change in pull. The resistor 54 is therefore added to the capacitor circuit to give the desired resistance and provide for a substantially uniform change in the magnetic pull due to the effect of winding 48. However, instead of the resistor 54, sufficient resistance may be obtained in the capacitor circuit by utilizing a coil for the winding 48 formed from wire of a smaller size, and which will have the resistance necessary to give the uniform change in the magnetic pull.

Although this invention has been described with reference to a particular embodiment thereof, it is, of course, not to be limited thereto except insofar as is necessitated by the scope of the attached claims.

I claim as my invention:

1. In a voltage regulating system, in combination, a generator the voltage of which is to be regulated, a plurality of shunt field windings for exciting the generator, a rheostat for controlling the voltage impressed on the shunt windings, means for actuating the rheostat, the rheostat actuating means comprising a main control winding responsive to the generator voltage, a second winding and a plurality of capacitors which are connected in parallel circuit relation to each other, the second winding and one of the parallel connected capacitors being connected in series circuit relation with each other and across each of the field windings to respond to the voltage of the field windings whereby current flows in the second winding to change the magnetic field induced by the main winding and control the operation of the rheostat operating means, the magnetic polarity of connections of the second winding being the same as the magnetic polarity of connections of the main control winding when the voltage of the field windings is increasing.

2. In a voltage regulating system, in combination, a generator the voltage of which is to be regulated, a plurality of shunt field windings for exciting the generator, a rheostat for controlling the voltage impressed on the shunt windings, means for actuating the rheostat, the rheostat actuating means comprising a main control winding responsive to the generator voltage, a second winding and a plurality of capacitors which are connected in parallel circuit relation to each other, the second winding and one of the parallel connected capacitors being connected in series circuit relation with each other and across each of the field windings to respond to the voltage of the field windings whereby current flows in the second winding to change the magnetic field induced by the main winding and control the operation of the rheostat operating means, the magnetic polarity of connections of the second winding being the same as the magnetic polarity of connections of the main control winding when the voltage of the field windings is increasing, the second winding and capacitor circuits having sufficient resistance to prevent rapid change in the current flowing therein to give a substantially uniform change in the magnetic pull.

3. In a voltage regulating system, in combination, a generator the voltage of which is to be regulated, a plurality of shunt field windings for exciting the generator, a rheostat for controlling the voltage impressed on the shunt windings, means for actuating the rheostat, the rheostat actuating means comprising a main control winding responsive to the generator voltage, a second winding and a plurality of capacitors which are connected in parallel circuit relation to each other, the second winding and one of the parallel connected capacitors being connected in series circuit relation with each other and across each of the field windings to respond to the voltage of the field windings whereby current flows in the second winding to change the magnetic field induced by the main winding and control the operation of the rheostat operating means, and a resistor connected in series circuit relation with the second winding and capacitors connected in series therewith to prevent a rapid change in the current flowing in the second winding to effect a substantially uniform change in the magnetic pull, the magnetic polarity of connections of the second winding being the same as the magnetic polarity of connections of the main control winding when the voltage of the field windings is increasing.

4. In a voltage regulating system, in combination, a generator the voltage of which is to be regulated, a plurality of shunt field windings connected in parallel circuit relation for exciting the generator, a resistor having a plurality of resistor sections disposed to be connected in series circuit relation with the field windings respectively in a predetermined sequence, means for progressively varying the number of the resistor sections connected in circuit with the field windings for controlling the energization of each field winding, means for actuating the progressive varying means, the actuating means comprising a main control winding responsive to the generator voltage, a second winding connected across each of the field windings, and a capacitor provided for each of the field windings and connected in series circuit relation with the second winding but in parallel circuit relation to each other, each of the capacitors being responsive to a change in the voltage across its associated field winding to effect a flow of current in the second winding to change the magnetic field induced by the main winding and control the operation of the resistor operating means, the magnetic polarity of connections of the second winding being the same as the magnetic polarity of the main control winding when the voltage of the field windings is increasing.

5. In a voltage regulating system, in combination, a generator the voltage of which is to be regulated, a plurality of shunt field windings connected in parallel circuit relation for exciting the generator, a resistor having a plurality of resistor sections disposed to be connected in series circuit relation with the field windings respectivey in a predetermined sequence, means for progressively varying the number of the resistor sections connected in circuit with the field windings for controlling the energization of each field winding, means for actuating the progressive varying means, the actuating means comprising a main control winding responsive to the generator voltage and a second winding connected across each of the field windings, and a capacitor provided for each of the field windings and connected in series circuit relation with the second winding but in parallel circuit relation to each other, each of the capacitors being responsive to a change in the voltage across its associated field winding to effect a flow of current in the second winding to change the magnetic field induced by the main winding and control the operation of the resistor operating means, and sufficient resistance being provided in the second winding and capacitor circuits to prevent rapid change in the current flowing therein to give a substantially uniform change in the magnetic pull, the magnetic polarity of connections of the second winding being the same as the magnetic polarity of connections of the main control winding when the voltage of the field windings is increasing.

DONALD W. EXNER.